F. H. Bartholomew.

Water-Closet Valve.

No. 1,071. Re. Patented Nov. 13, 1860.

Witnesses,
J. H. Bartholomew
H. A. Taily

Inventor.
F. H. Bartholomew

UNITED STATES PATENT OFFICE.

FREDERICK H BARTHOLOMEW, OF NEW YORK, N. Y

METHOD OF GOVERNING THE ACTION OF VALVE-COCKS

Specification forming part of Letters Patent No. 2,863, dated June 20, 1854; Reissue No. 1,671, dated November 13, 1856.

DIVISION A.

*To all whom it may concern:*

Be it known that I, FREDERICK H. BARTHOLOMEW, of the city of New York, N. Y., have invented certain new and useful Improvements in water-closets, specially adapted to that class of closets termed "hopper-closets," and also to urinals, but likewise useful for other purposes; and the following specification, taken in connection with the drawings, is a full, clear, and exact description thereof.

My invention as embodied by me constitutes an apparatus by means of which water may be saved, and at the same time a sufficient supply admitted to the hopper of the closet or to the basin of the urinal, and by which any injurious concussion upon pipes from sudden closing of valves is avoided, and also a combination of such apparatus with a yielding seat of a closet, or what is its equivalent, the yielding standing-board or platform of a urinal.

Figure 1:
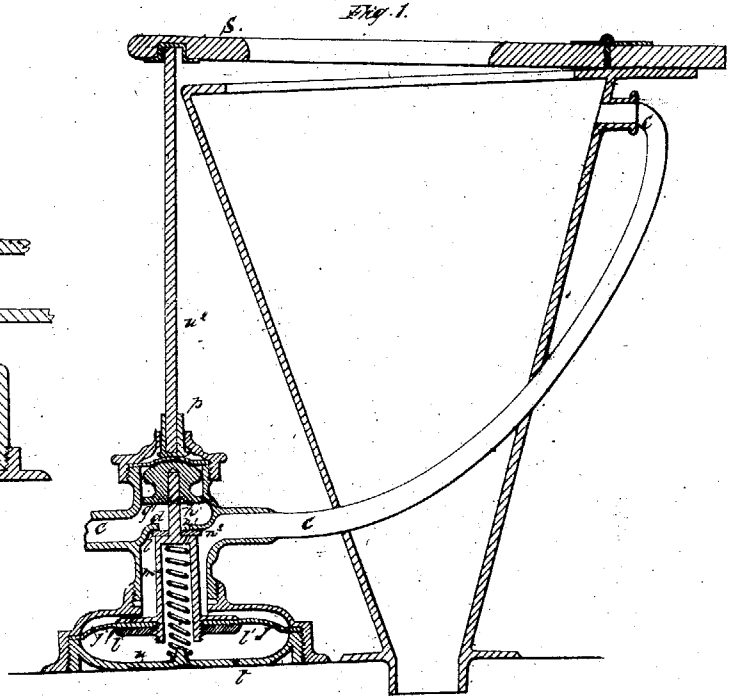
Figure 2:
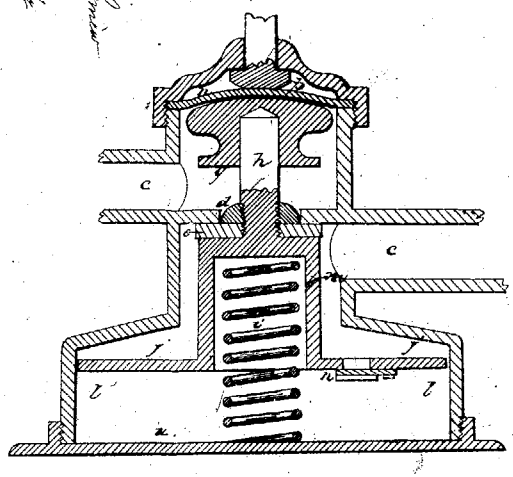

In the drawings, Figure 1 is a vertical section through the whole apparatus, including the yielding seat; and Fig. 2 is a section through a modified form of the valve and variable chamber, not showing the seat.

The apparatus therein represented consists, as a whole, of the following parts, viz: first, a yielding seat or platform; second, two valves, both operating, although at different times, to open and close a passage leading from any proper reservoir of water to a hopper or urinal-basin; third, a variable chamber, or chamber of variable capacity, which is to be alternately filled and discharged with water or air, and is so constructed that it must of necessity change its size gradually, either when increasing or decreasing in capacity, or both, and is so attached to the valves that their opening or shutting, or both, shall be governed by the speed at which the chamber varies its capacity; and, fourth, a connection between the valves or the variable chamber, or both of them, and the yielding seat of the closet or stand of the urinal; and, fifth, a contrivance for closing one of the valves when the seat rises or is lifted. And by a variable chamber I mean either a hollow cylinder shut at one end and provided with a piston, or a cup or box closed by a flexible diaphragm, or any of the equivalents of these well known as in use in pumps, steam engines, and blowing-machines. And the contrivance by means of which the piston or diaphragm is caused to move slowly and the chamber or hollow to vary its capacity slowly is a small aperture so made as to lead from the hollow of the chamber to any proper source of supply of air or water, so that when the capacity of the chamber is enlarged it can be increased only as fast as water or air will enter through the aperture to fill the gradually increasing space, and when the capacity of the chamber is decreased it can diminish only so fast as water or air will flow out of the aperture from the chamber, it being noted that when air is used the motions of the piston or diaphragm will also depend in some measure upon the expansion and contraction of air, and also that I sometimes intend to apply other contrivances which shall act so that the speed at which the variable chamber changes its capacity may be governed by the flow of fluid in one direction only.

By the word "valve" or "valves," I mean any proper contrivance for opening or closing an orifice, and by connection or attachment between the chamber and valves I mean any suitable contrivance which shall so combine together a valve and a variable chamber that the motions of the former shall be controlled or governed by either the increasing or decreasing of the capacity of the latter, or by both its increase and decrease.

By connection between the yielding seat or platform and the valves or chamber I mean any proper contrivance which will cause the depression of the former to actuate either of the latter.

In the drawings, *c c* is a pipe or passage leading from a street-main or any proper source of supply of water to a hopper, the connections not being shown in the drawings. The valve-seat in this passage is shown at *d*, and above and below this seat lie two valves, *e g*, the former seating against the bottom, the latter against the top, of the valve-seat. The valve *g* rests upon a spindle, *h*, and the valve *e* makes a part of that spindle. This spindle is hollowed at its lower end, and has inserted therein a spring, *i*, which will, when permitted, force the lower valve to its seat, thereby closing the opening through *d*, and to the lower end of this spindle is attached either a piston, *j*, or a diaphragm, *j'*. When the diaphragm is used, its periphery is firmly clamped, substantially as shown in the drawings, to the top of a box or cup, *l'*. When the piston is used its periphery fits the bore of a cylinder, *l*, closed by a bottom or cap, *u*, and the space between the piston and the cylinder-bottom inclosed by the cylinder, and the space between the diaphragm and the cavity of the cup constitute variable chambers. If the variable chamber is to receive and expel air, a small aperture, such as *t*, is to be made connecting the hollow with the outer air, and if its change of capacity is to be controlled by the entrance and ejection of water small apertures, such as *m m'*, are to connect its hollow with the passage *c* or any suitable reservoir of water.

In case it is desired that the chamber should increase in size rapidly, a small valve like *n*, opening inward into the hollow may be applied in any convenient place, and if, on the contrary, it should be required that the chamber should decrease in capacity rapidly, then a valve like *n'*, opening outward may be used. The valve *n* is an ordinary self-acting clock-valve, and the valve *n'* is a disk of leather lying losely on top of the valve *e*, and serving not only as a valve for the aperture $n^2$, but as a packing for the valve *e*. The top of the valve *g* rests against a diaphragm, *r*, clamped across an extension of the passage *c*, and upon this diaphragm rests the end of a hollow spindle, *p*, in which rests another spindle, $u^2$, upon the upper end of which rests the yielding seat *s*. A stuffing-box might be substituted for the diaphragm *r*, but I prefer the latter.

It will be seen from this description that this stem forms the attachment between the moving part of the variable chamber and the valves, and the spindles make the connection between the valves and the seat.

The action of the apparatus will be as follows, supposing the air-apertures stopped, and the valves *n* and *n'* removed: When a person rests his weight on the seat or platform, the spindles, valves, and stems will be depressed, the lower valve will leave its seat, the passage will be opened, and water will flow into the hopper or urinal. The spindles and valves will, however, descend slowly, no faster than water can escape out of the small apertures leading from the hollow of the variable chamber, and they will continue thus to descend gradually until the upper valve is seated, shutting off the flow of water. No more water will flow as long as the seat or platform is held down, but when it is released, then the spring, compressed on the descent of the valves, will commence to lift the valves, again opening the passage gradually by the rise of the upper valve, permitting water to flow, and again closing the passage gradually by the rise of the lower valve, the gradual rise being regulated by the flow of water into the cavity of the variable chamber through the small holes. There will thus be two flows of water each time that the closet or urinal is used, and the amount of flow will depend upon the controlling action of the variable chamber, and will not be increased or diminished in proportion to the length of time that the seat is held down. A sufficient quantity of water, without waste, is thus insured. It will also appear that by the gradual closing of the valves all water-ram action or sudden concussions upon the pipes connecting with the resevoir are avoided. The tendency to burst such pipes will therefore be prevented, and this is an important result, and where the amount of water used is not a material consideration a yielding seat may be employed in connection with one valve only, governed by a variable chamber. In such a case waste of water arising from long depression of the seat will not be prevented, but the combination will act advantageously by preventing concussion.

When air is to be used for governing the motions of the variable chamber, the water-passages into the cavity of that chamber are to be dispensed with, and holes leading to the outer air are to be substituted. The same results will follow, varied in degree, however, by the expansion and compression of the air.

When a flow of some duration is required on the rising of the seat only, then a valve opening outward from the hollow like *n'* is to be used. When a flow of considerable duration on the descent of the platform or seat only is required, a valve opening inward to the hollow of the variable chamber like *n* may by applied. In the former case the valve will permit the rapid egress of fluid from the chamber, so that its capacity can diminish rapidly, and the valves may then move quickly, while in the latter case the valve will admit the fluid to enter the hollow quickly, so that its capacity increases speedily, and consequently the valves move rapidly so long as the valve $n^2$ is open.

When one valve only is used, it should be the one that closes when the seat rises, and the precise apparatus shown in the drawings will answer if the upper valve be removed.

Now, I wish it to be distinctly understood that any suitable valves may be used in place of the valves shown in the drawings; that any suitable contrivance may be employed for closing one of the valves when the seat is freed from weight or pressure, as an equivalent for the spring shown in the drawings; that any proper connection or attachment may be applied between the valves and the variable chamber, or between these and the seat, so long as the connections cause them all to act in unison, substantially as described, and that the construction of the variable chamber and the apertures from its hollow may be modified in various ways, so long as it is a variable chamber which causes water or air to enter its hollow gradually when its capacity is increased, and expels fluid from its hollow when its capacity is decreased, and that such alterations may be made without departing from the principles of my invention, so long as the various parts are combined together as hereinbefore described, for my invention does not consist in the construction of any of the parts of the before-described apparatus taken separately, but only in certain combinations of them for useful purposes, as before set forth.

I claim as of my own invention—

1. The combination of these three elements or devices, viz: first, a variable chamber provided with proper apertures for admission and discharge of fluid; second, two valves acting to open and close a passage through which water may flow, the one being on its seat or closing the passage when the variable chamber is of largest capacity, and the other being in a like position or performing the same office when the capacity of the chamber is smallest; third, a proper connection between the valves and the variable chamber, so applied that the motions of the former shall be controlled by the latter, the whole three being constructed and acting in combination, substantially in the manner and for the purposes hereinbefore described, when operated upon by any competent force.

2. The combination of two valves, a variable chamber, and a connection between them, all substantially such as hereinbefore last enumerated, with a seat or platform, substantially such as herein described, by means of a connection, substantially such as set forth, whereby the seat or platform, the valves, and the variable chamber, all act in unison, substantially as set forth.

3. As a means of preventing concussions on pipes supplying urinals or hopper-closets, where the amount of water used is not a material consideration, and where yielding seats or platforms are employed to open a supply-valve, the combination, substantially as hereinbefore described, of a variable chamber, a single valve, and a yielding seat or platform with proper connections and attachments, so that the motions of the valve may be caused by the seat and governed by the variable chamber, substantially as described.

4. The combination of a diaphragm performing the duty of a stuffing-box with a valve or valves, and with a variable chamber controlling the valve or valves, the whole constructed and operating substantially as hereinbefore recited In testimony whereof I have hereunto subscribed my name.

FREDERICK H. BARTHOLOMEW.

Witnesses:

ALEX. WALDRON,

JAS. KENWICK.